United States Patent [19]
Ford et al.

[11] Patent Number: 5,865,383
[45] Date of Patent: Feb. 2, 1999

[54] HIGH VOLUME GRINDER

[75] Inventors: David F. Ford, Springfield; Daniel R. Ephraim, Glencoe, both of Ill.

[73] Assignee: Bunn-O-Matic Corporation, Springfield, Ill.

[21] Appl. No.: 854,120

[22] Filed: May 9, 1997

Related U.S. Application Data

[63] Continuation of Ser. No. 723,302, Sep. 30, 1996, abandoned.

[51] Int. Cl.$^6$ .......................... B02C 19/12; B02C 19/22
[52] U.S. Cl. ........................ 241/36; 241/79.1; 241/81; 241/100; 241/260.1
[58] Field of Search .............................. 241/100, 33, 36, 241/79.1, 81, 260.1, 606

[56] References Cited

U.S. PATENT DOCUMENTS

| | | | |
|---|---|---|---|
| 2,019,013 | 10/1935 | Kopf et al. | 241/100 X |
| 2,290,747 | 7/1942 | Henry | 226/58 |
| 2,309,246 | 1/1943 | Henry | 241/100 X |
| 2,588,025 | 3/1952 | Margolin | 241/100 |
| 2,900,140 | 8/1959 | Schuhmann et al. | 241/100 X |
| 3,094,290 | 6/1963 | Engi | 241/100 |
| 4,350,307 | 9/1982 | Olson | 241/81 |
| 4,607,200 | 8/1986 | Zimmerman | 318/484 |
| 5,201,474 | 4/1993 | Midden | 241/100 |

FOREIGN PATENT DOCUMENTS

| | | | |
|---|---|---|---|
| 1312229 | 11/1962 | France | 241/100 |
| 1027379 | 4/1958 | Germany | 241/36 |
| 1232709 | 1/1967 | Germany | 241/100 |
| 1808300 | 4/1993 | U.S.S.R. | 241/100 |

*Primary Examiner*—John M. Husar
*Attorney, Agent, or Firm*—Trezler, Bushnell, Giangiorgi & Blackstone, Ltd.

[57] ABSTRACT

A grinder for grinding materials to produce a ground substance. The grinder includes a cabinet, a grinder motor retained in the cabinet, and a grinder mechanism coupled to the motor to grind the materials. A hopper is positioned in communication with the grinder mechanism to deliver materials for grinding. The container retainer is attached to the grinder for retaining a container in close proximity for capturing ground material dispensed thereby. An activation switch assembly is included with the grinder to selectively control the grinder and activate the grinder when a container is placed in a desired location. A substance settling assembly is included with the grinder for removing a container retained by the grinder to settle the substance as it is dispensed from the grinder to the container. A chaff retainer is provided for maintaining chaff included with the ground substance in mixture with the ground substance. A clean-out member is operatively attached to the grinder and selectively engageable with the chaff retainer for removing chaff from the grinder. A magnetic collection device is positioned in the hopper for capturing magnetic pieces which may be deposited in the hopper. An active ventilation system is also included with the grinder for actively and controllably removing heat from the grinder cabinet.

25 Claims, 6 Drawing Sheets

HIGH VOLUME GRINDER

Cross Reference

This application is a Continuation of U.S. patent application Ser. No. 08/723,302, filed Sep. 30, 1996 now abandoned.

BACKGROUND

The present invention is directed to a grinder which can grind a large range of volumes of substance to be ground. More particularly, the present invention is directed to a grinder for use in grinding substances such as whole bean coffee.

A variety of grinding devices or grinders have been provided by the prior art. In particular, the Assignee of the present invention notes three patents which show grinding devices: U.S. Pat. Nos. 5,042,731 issued Aug. 27, 1991 to Ford; 4,813,622 issued Mar. 21, 1989 to Nidiffer et al.; and 4,714,206 issued Dec. 22, 1987 to Nidiffer et al. All three of these patents show grinding devices which are designed to grind beverage brewing substances such as whole bean coffee for producing a brewed beverage therefrom.

The Ford '731 patent and the Nidiffer et al. '622 patent show grinders which include a discharge chute or discharge chute assembly which prevents a separation of chaff from the ground coffee. Many types of coffee beans have a thin membrane which dries during the roasting process. Upon grinding of the coffee beans, the thin membrane is separated from the rest of the coffee bean creating a light bean debris which separates during grinding. The dried, ground membrane is commonly called chaff. Chaff does not detract from the flavor of coffee, however, due to its light weight, it is prone to being separated from the ground coffee discharged from the grinder to a container waiting therebelow. Free-floating chaff can create problems within the grinder and therefore it is desirable to retain the chaff within the bulk of the ground coffee. Further, it is desirable to retain chaff in the coffee in order to help reduce caking problems which typically occurs in ground coffee especially oiler, dark roasted coffee bean as such as ground coffee is discharged from the grinder. Both devices as shown in Ford '731 and Nidiffer '206 show such chaff retaining structures.

One of the problems encountered with retaining chaff in the ground substance dispensed from the grinder is that the mechanisms to retain chaff often results in ground coffee or build-up within the grinder. One of the mechanisms for retaining chaff in the ground coffee is to provide a back pressure on the grinder to prevent the free-flow of ground coffee from the grinder which results in air separation of the chaff from the ground coffee. If the ground coffee were free to flow from the grinder, the chaff being a lighter substance, would tend to separate as the ground coffee is dispensed into the collection container. As such, structures are provided which prevent the "blowing" of ground coffee from the grinder. As the coffee is dispensed from the grinder, it tends to flow into the bag thereby preventing the separation of the chaff from the ground coffee. However, these back pressure creating structures tend to result in accumulation of chaff thereon or on the discharge assembly structure. As such, it is desirable to provide mechanisms to remove the ground coffee and chaff from these structures.

As might be expected, when a finite volume of whole bean coffee is ground, it tends to be fluffed or expanded during the grinding process. As such, when the ground coffee is dispensed into a waiting container such as a bag, the finite volume which previously fit into the bag will likely overflow the bag as a result of the fluffing or lofting created during the grinding process. Part of the reasons for the lofting is the retention of the chaff within the ground coffee. However, it is desirable to retain the chaff in the ground coffee for the reasons noted hereinabove.

Heretofore, prior art devices have not solved the problem of fluffing. As such, users of prior art devices have been required to manually shake or tap the ground contents into the container or bag in order to prevent overflowing. This problem is also seen in coffee stores which sell whole bean coffee for grinding on the premises. The salespeople must wait for coffee to be ground and tap or shake the bag in order to prevent overflowing. As might be expected, this waiting reduces the customer service rate and incrementally increases the labor time associated with the grinding of whole bean coffee.

To further facilitate the automatic settling of coffee, it would be desirable to place a bag near or on the grinder and allow the operator to leave the bag during the grinding process. As such, a bag retaining device would be desirable for use with a grinding process which automatically settles the ground coffee. A bag retainer as shown in U.S. Pat. No. 2,290,747 issued Jul. 21, 1942 to Henry. The bag holder device as shown in Henry is complicated and as such it would be desirable to provide a simplified bag holding structure.

Another problem encountered with coffee grinders is that it is desirable to prevent grinding prior to the proper placement of a bag near the dispensing chute. U.S. Pat. Nos. 5,220,998 issued Jun. 22, 1993 to Ford; 4,714,206 issued Dec. 22, 1987 to Nidiffer et al.; and 4,685,624 issued Aug. 11, 1987 to Nidiffer show switches which are generally activated by the placement of a bag beneath a dispensing or discharge chute assembly. While these devices assure that a bag must be somehow placed relative to the discharge chute assembly, they do not retain the bag in position against or for dispensing from the discharge chute assembly.

Other problems which occur with prior art devices is that particles of metallic material may be accidentally deposited in the grinder hopper and subsequently ground into the ground coffee discharged therefrom. While coffee is placed into a filter, generally either paper or metal mesh, and thus kept separate from the actual beverage liquid produced during the brewing process, introduction of metal into the ground coffee may produce undesirable flavor. Additionally, it is always preferable to prevent undesirable substances from being mixed into foodstuffs. The prior art, heretofore known, has no means for extracting such metallic materials. As such, it would be desirable to extract such metallic materials from whole bean coffee prior to grinding.

Finally, an additional problem which occurs with prior art grinders is that they generally handle only a small range of volumes. As such, such grinders may overheat and cease to operate if a substantial grinding burden is placed on them. As such, it would be desirable to provide a way of cooling the grinder to permit grinding of larger volumes and a greater range of volumes of whole bean coffee without overheating the grinding device.

OBJECTS AND SUMMARY

A general object of the present invention is to provide a grinder which can generally accommodate a large range of quantities of substances to be ground.

Another object satisfied by the present invention is to provide a grinder which automatically settles the ground substance dispensed therefrom.

A further object satisfied by the present invention is to provide a grinder which includes a switch assembly which prevents operation of the grinder unless a bag is placed in a preferred position.

Yet a further object of the present invention is to provide a grinder which includes a bag retaining assembly to retain a bag relative to the grinder for capturing a ground substance dispensed therefrom.

Further still, an object of the present invention is to provide a structure for releasing accumulating chaff from a discharge chute assembly.

Yet another object of the present invention is to provide a grinder having a magnetic structure which captures magnetic material which may be inadvertently or accidentally placed in a grinder hopper thereof.

Moreover, yet another object of the present invention is to provide a grinder which includes a thermostatic control and a fan for controllably venting heated air from a cabinet of the grinder to prevent overheating of a grinder motor retained therein.

Briefly, and in accordance with the foregoing, the present invention envisions a grinder for grinding materials to produce a ground substance. The grinder includes a cabinet, a grinder motor retained in the cabinet, and a grinder mechanism coupled to the motor to grind the materials. A hopper is positioned in communication with the grinder mechanism to deliver materials for grinding. The container retainer is attached to the grinder for retaining a container in close proximity for capturing ground material dispensed thereby. An activation switch assembly is included with the grinder to selectively control the grinder and activate the grinder when a container is placed in a desired location. A substance settling assembly is included with the grinder for removing a container retained by the grinder to settle the substance as it is dispensed from the grinder to the container. A chaff retainer is provided for maintaining chaff included with the ground substance in mixture with the ground substance. A clean-out member is operatively attached to the grinder and selectively engageable with the chaff retainer for removing chaff from the grinder. A magnetic collection device is positioned in the hopper for capturing magnetic pieces which may be deposited in the hopper. An active ventilation system is also included with the grinder for actively and controllably removing heat from the grinder cabinet.

BRIEF DESCRIPTION OF THE DRAWINGS

The organization and manner of the structure and function of the invention, together with farther objects and advantages thereof, may be understood by reference to the following description taken in connection with the accompanying drawings, wherein like reference numerals identify like elements, and in which.

DESCRIPTION

Figure 1:
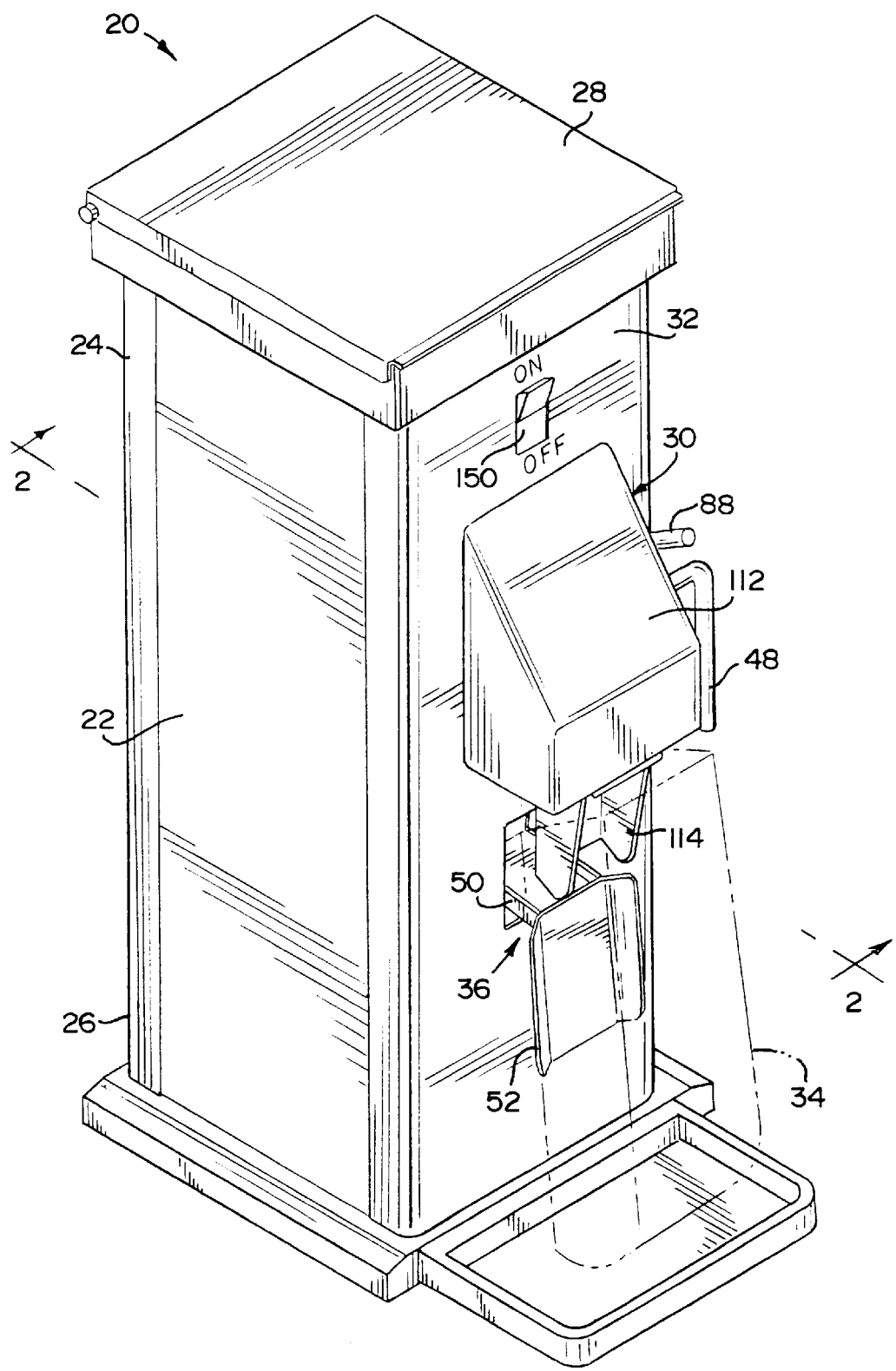
FIG. 1 is a perspective view of a grinder of the present invention which includes a cabinet having a lid thereon for receiving and grinding whole bean coffee which is dispensed through a discharge chute assembly into a container (shown in phantom line as a coffee bag) which is positioned for agitation or shaking by a shaker assembly.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIG. 1 shows a grinder 20 of the present invention including a cabinet 22 having an upper portion 24, a lower portion 26 and a lid 28 covering the upper portion. A discharge assembly 30 is positioned on a front side 32 of the cabinet 22 for dispensing a ground substance therethrough. A container or bag 34 (shown herein in phantom line in the interest of clarity) is positioned beneath the discharge assembly 30 and against a substance settling assembly 36 which is described in greater detail hereinbelow.

The present invention includes the grinder 20 as well as various systems associated with and/or used with the grinder. While the grinder of the present invention is broadly used for grinding a material to produce a ground substance and the systems of the grinder may be used in a variety of different applications, the present description will generally refer to material as whole bean coffee or coffee beans and the ground substance as ground coffee. As the grinder may be used in other applications as will be evident upon review of this description, the description is not intended to limit the description of the present invention solely to a coffee grinder.

With further reference to FIGS. 2–10, the present invention includes a container retaining assembly 38 (see FIGS.

Figure 2:
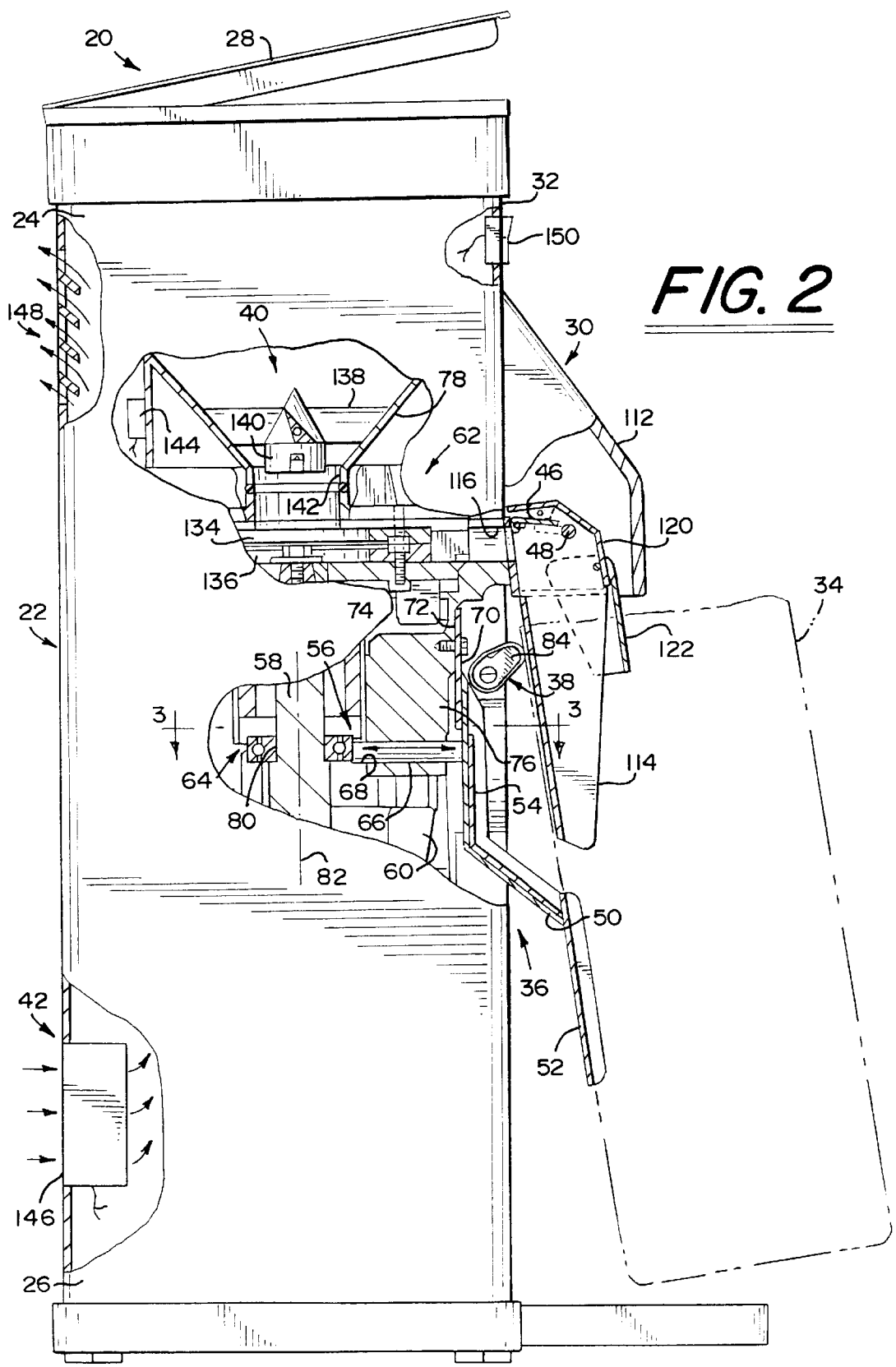
FIG. 2 is a partial fragmentary, cross-sectional, side-elevational view of the grinder as shown in FIG. 1 further illustrating components of the discharge chute assembly, the shaker assembly, control switch mechanisms, the grinder, as well as a thermostatically operated active ventilation system.
Figure 3:
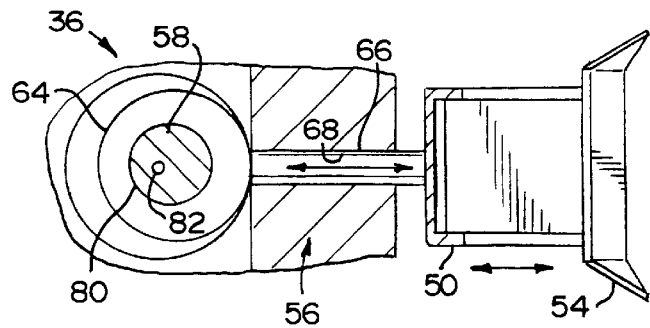
FIG. 3 is a partial fragmentary, cross-sectional, top plan view of a portion of the shaker assembly showing a cam attached to an eccentric portion of a motor shaft which operates an actuator rod to reciprocate the shaker arm.

2 and 4–7), a magnetic assembly 40 (see FIG. 2), an active ventilation system 42 (see FIGS. 2 and 10), an activation switch assembly 44 (see FIGS. 4–7 and 10), and a chaff retainer 46 operated by a clean-out member 48 (see FIGS. 2 and 7–9). Each of the foregoing portions of the present invention shall be described in greater detail hereinbelow. Also, FIGS. 1–3 provide an illustration of the substance settling assembly 36 of the present invention. As shown in FIG. 2, the substance settling assembly 36 includes a shaker arm 50 which has a shaker plate 52 on end thereof extending outside of the cabinet 22 and a mounting end 54 retained inside the cabinet 22. The substance settling assembly 36 also includes an agitating device 56 which is coupled to a drive shaft 58 driven by a motor 60. The motor 60 drives the drive shaft 58 to operate a grinder mechanism 62. The agitating device 56 utilizes the rotary motion of the motor shaft 58 to agitate, reciprocate or move the shaker arm 50. Movement of the shaker arm 50 moves or gently shakes the container 34 positioned near the discharge assembly 30 in order to settle ground coffee dispensed by the grinder.

The agitating device 56 includes an eccentric cam assembly 64 retained on the drive shaft 58 and an actuator rod 66 positioned to abut both the eccentric cam assembly 64 and the shaker arm 50. The actuator rod 66 is retained in a bore 68 which permits axial movement of the actuator rod 66 in response to the eccentric movement of the cam assembly 64. The actuator rod 66 translates the eccentric movement of the cam assembly 64 to displace or move the shaker arm 50 positioned thereagainst.

The mounting end 54 of the shaker arm 50 is attached to the grinder 20 by a spring 70. The spring 70 has a first end 72 and a second end 74. The first end 72 is mounted to the grinder 20 on a wall 76 of the grinder body. The second end 74 of the spring 70 is attached to the mounting end 54 of the shaker arm 50. As such, the spring 70 facilitates movement of the shaker arm 50 in response to the reciprocating action of the actuator rod 66.

In use, the substance settling assembly 36 operates to automatically move or shake ground coffee dispensed through the discharge assembly 30 into the container 34. The shaking helps to settle the ground coffee which, as a result of grinding, has greater loft than the whole bean. For example, if the container 34 is filled with whole bean coffee and the whole bean coffee is then deposited into a hopper 78 of the grinder 20, the resultant ground coffee will have a greater volume than the whole bean coffee which originally filled the container. As a result, the settling assembly 36 helps to prevent overflowing the container 34.

When operated, the drive shaft 58 rotates and thereby rotating the cam assembly 64 retained thereon. With further reference to FIG. 3, the cam assembly 64 is mounted on an eccentric portion 80 of the shaft 58. Because the eccentric portion 80 of the shaft 58 is offset from a central axis 82 of the shaft 58, the cam assembly 64 will oscillate relative to the axis 82. The oscillating motion of the cam assembly 64 will drive against the actuator rod 66 to drive the rod 66 outwardly through the bore 68 and against the abutting portion of the shaker arm 50. As can be seen from FIGS. 1 and 2, the arm 50 extends from the cabinet 22 a sufficient distance to abut a container 34 retained relative to the discharge assembly 30. The combination of the spring 70 to which the arm 50 is attached and the position of the arm 50 relative to the container creates a return force on the arm 50 as the container 34 fills with ground coffee. Therefore, the container 34 rests against the plate 52 of the arm 50 to produce a return force on the actuator rod 66 to promote the reciprocating action of the rod 66 and the subsequent reciprocal movement of the arm 50. With reference to FIG. 3, as the actuator rod 66 is driven towards the shaker arm 50 as a result of the movement of the cam 64, the arm 50 will create a return force driving the rod 66 towards the cam 64 in response to the continued eccentric rotation of the cam 64 relative to the axis 82 of the shaft 58.

Ultimately, the operation of the substance settling assembly 36 while grinding coffee will result in simultaneously grinding coffee, dispensing coffee into the container 34, and settling the ground coffee in the container during the grinding process. At the end of the grinding process, the user of the grinder will not need to tap or manually settle the ground coffee. Also, the ground coffee will not overflow the container as a result of the lofting or fluffing of the ground coffee during the grinding process because the ground coffee will already be settled. Settling of the ground coffee will help to prevent waste, cleanup, and clogging or entrapment of ground coffee in components of the grinder.

Having now described the substance settling assembly 36, attention is now turned to the container retainer or container retaining assembly 38 and the activation switch assembly 44. The container retaining assembly 38 and activation switch assembly 44 work in combination to retain a container 34 relative to the discharge assembly 30 and to prevent inadvertent operation of the grinder 20 in the absence of a container 34. The retaining assembly 38 and switch assembly 44 are shown in FIGS. 2 and 4–7. As shown in FIGS. 2, 4–6, the container retaining assembly 38 includes a cam body 84 which is pivotally retained on a portion of the grinder body 86 by attachment to a control rod 88 extending through the grinder body 86 and cam body 84. A set screw 90 extends through the cam body 84 to hold the cam body 84 to the control rod 88. As such, the cam body 84 may be moved from a release position (see FIG. 4) to a retaining position (see FIG. 5) whereby a portion of a container 34 is retained between the cam body 84 and a portion of the discharge assembly 30.

The length of the cam body 84 from an axis of rotation 92 to a distal end 94 thereof is greater than a dimension from the axis of rotation 92 to the portion of the discharge assembly against which the container is held. The cam body 84 also includes at least one and, as illustrated, a pair of O-rings 96 which increase the frictional contact between the cam body 84 and the surface of the container 34 engaged by the cam body 84. The shape, mounting location and position of the cam body 84 prevents inadvertent disengagement of the container 34 from the discharge assembly 30 when the cam body 84 is in the retaining position (see FIG. 5). In fact, forces applied to the container to disengage the container from the discharge assembly will produce increased gripping forces by the cam body 84 on the container 34.

The ability of the container retaining assembly 38 to increase the engaging force against a container 34 upon applying a disengaging force to the container 34 is useful in combination with the substance settling assembly 36 of the present invention. The substance settling assembly acts against a side of the container 34 and thus applies a degree of disengaging force to the container. Additionally, as the container 34 fills with ground coffee downward forces created by the weight of the coffee tend to work to disengage the container from the discharge assembly 30. As such, the container retaining assembly 38 holds a container 34 in proper position below the discharge assembly 30 during the grinding process.

Figure 4:
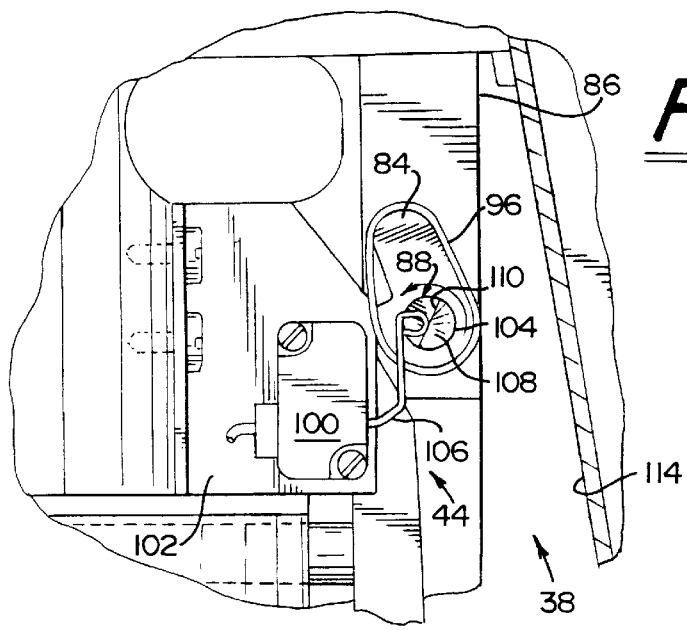
FIG. 4 is an enlarged, partial fragmentary, cross-sectional, side-elevational view of a switch assembly and a bag holder cam coupled therewith in which a switch of the assembly is in a motor deactivated position.
Figure 5:
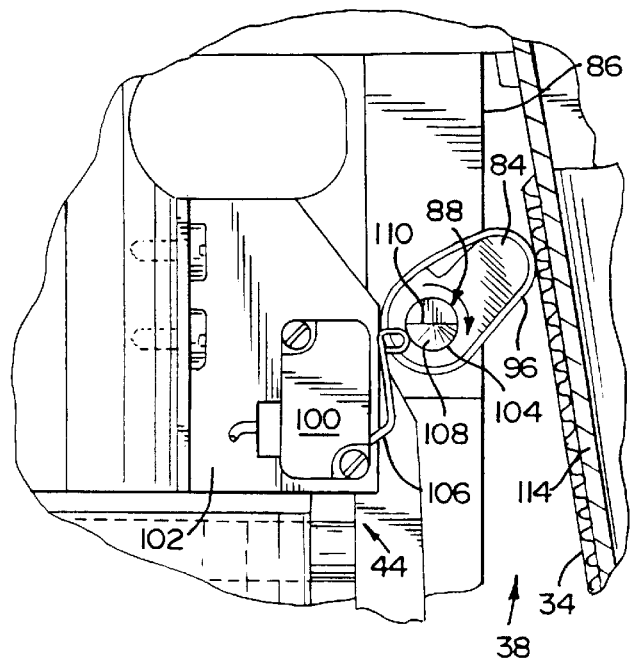
FIG. 5 is a partial fragmentary, cross-sectional, side-elevational view similar to that as shown in FIG. 4 in which the switch has been moved to a motor activating position to activate the grinder motor.

In the present invention, as illustrated, the switch assembly 44 operates in combination with the container retaining assembly 38. The switch assembly 44 includes a roller switch 100 generally of known construction. The roller switch 100 is attached to a switch bracket 102 and is positioned relative to an extending portion 104 of the control rod 88. The switch 100 is coupled to the motor 60 to enable or disable the motor as a result of the presence or absence of a container beneath the discharge assembly for receiving ground coffee therein. The switch disables the motor when the container retaining assembly is in the release position (see, FIG. 4) thereby preventing grinding of coffee and dispensing of ground coffee through the discharge assembly when a container is not present. As shown in FIG. 5, the switch 100 enables operation of the motor 60 when the container retaining assembly is in the retaining position. As such, the switch enables operation of the motor when a container is positioned relative to the discharge assembly.

A switch arm 106 extends from the roller switch 100 towards the extending portion 104 of the control rod 88. The terminal end of the extending portion 104 includes an arcuate portion 108 and a generally planar portion 110. As shown in FIG. 4, the switch arm 106 advances forwardly against the planar portion 110 when the cam body 84 is raised into the release position. As the cam body 84 is rotated towards the discharge assembly 30 to engage a container therebetween, the switch arm 106 is displaced by the arcuate portion 108 thereby enabling the operation of the motor 60.

Figure 6:
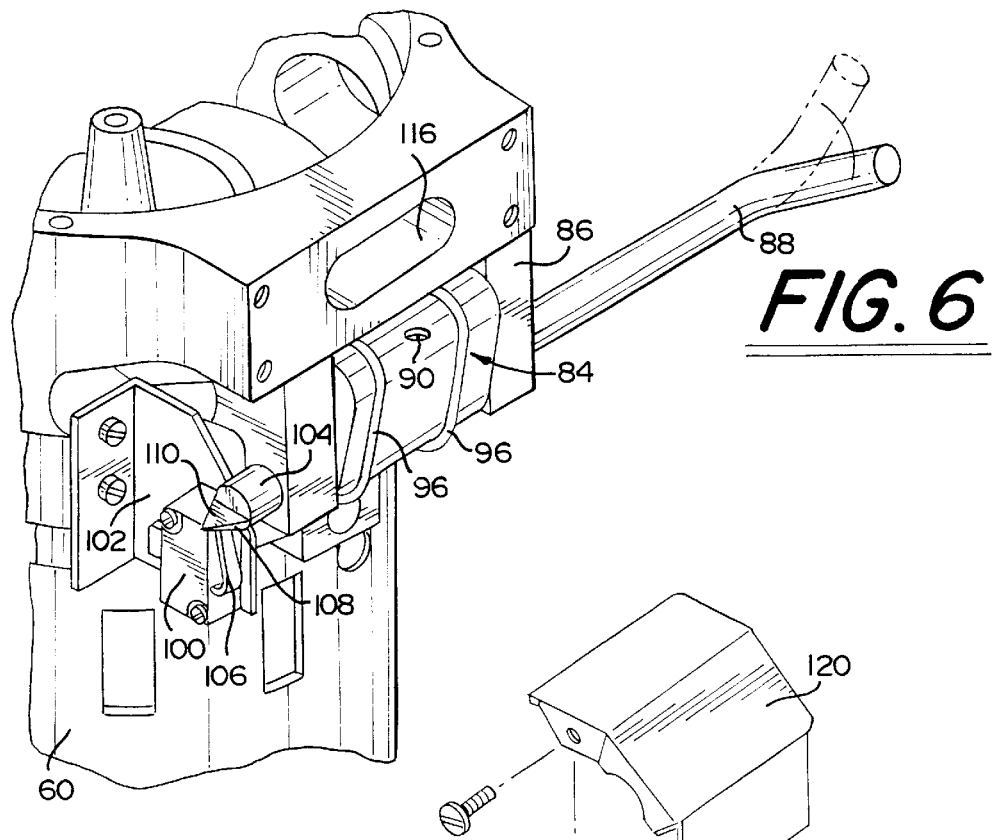
FIG. 6 is an enlarged, partial fragmentary, perspective view of a portion of the grinder assembly showing the bag retainer and switch assembly in which a bag holder control rod has been operated forwardly to move a bag retainer cam into a position which retains a bag against a channel chute of the discharge chute assembly and to move the switch to a motor activating position as shown in FIG. 5.
Figure 7:
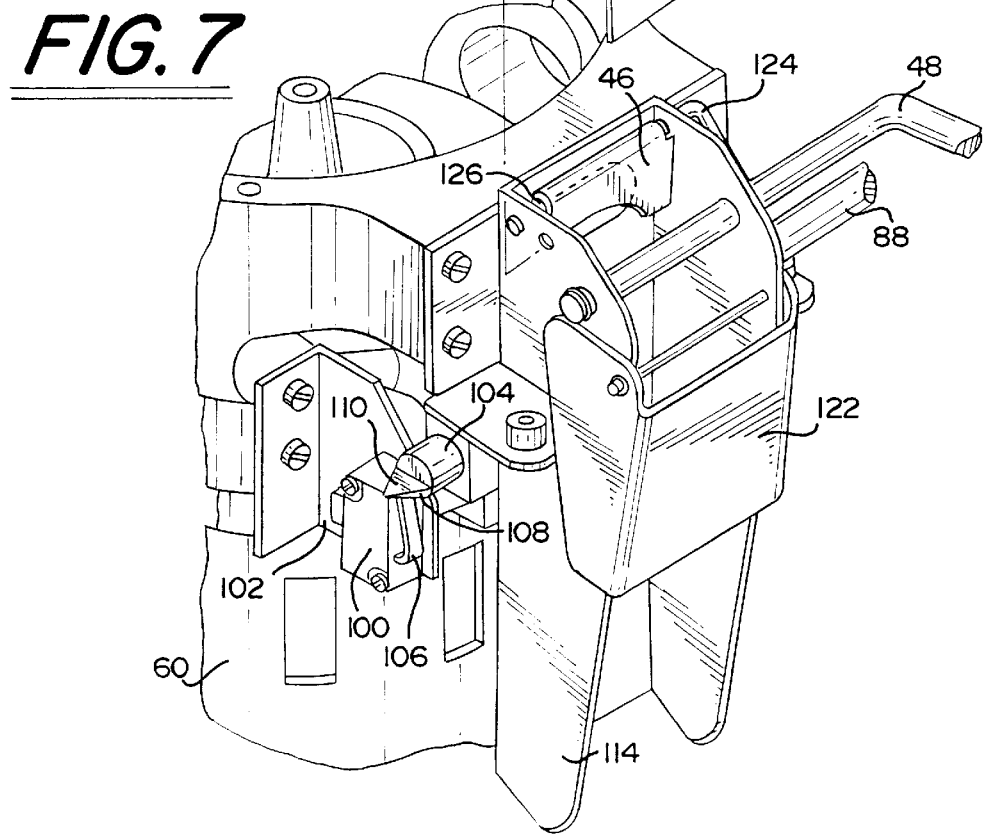
FIG. 7 is an enlarged, partial fragmentary, perspective view similar to that as shown in FIG. 6 further including portions of the discharge chute assembly attached to a discharge hole of the grinder to show the assembly thereof and a dechaffer plate which is positioned and spring biased toward the discharge hole.
Figure 8:
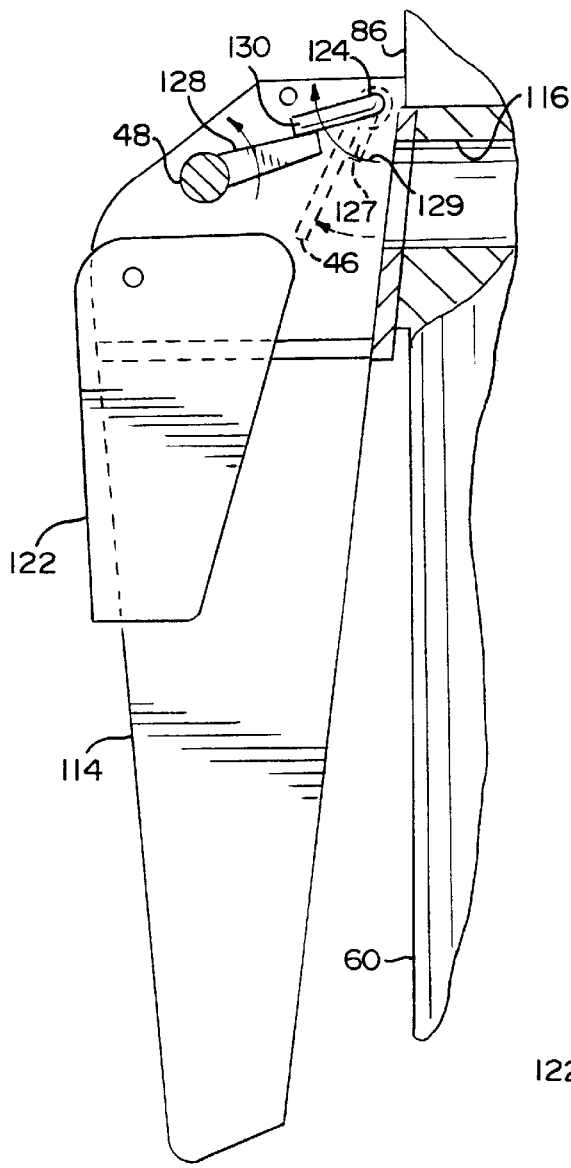
FIG. 8 is an enlarged, partial fragmentary, cross-sectional, side-elevational view of the discharge chute assembly showing the operation of a clean-out rod to operate a pivot pin attached to the dechaffer plate.
Figure 9:
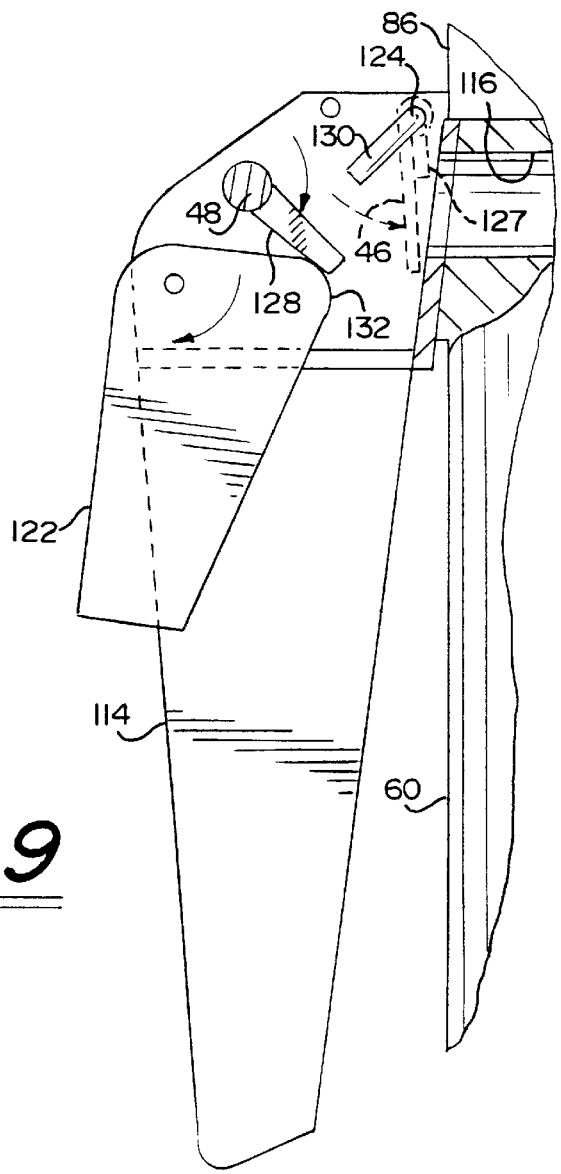
FIG. 9 is an enlarged, partial fragmentary, cross-sectional, side-elevational view similar to that as shown in FIG. 8 showing the operation and movement of a pivoting deflector upon rotating the clean-out rod in an opposite direction to the direction as shown in FIG. 8.

The structure of the extending portion 104 is more clearly shown in FIGS. 6 and 7 and in which the cam body 84 is generally shown in the "retaining" position.

In the preceding description, reference has been made to the discharge assembly 30. As shown in FIGS. 1, 2 and 7–9, the discharge assembly 30 includes a number of components. As shown in FIG. 1, the discharge assembly 30 includes a hood 112 extending from the cabinet 22. Underneath the hood 112 is a channel chute 114 which is positioned over a passage 116 extending from the grinder mechanism 62 to the discharge assembly 30. The channel chute 114 is positioned with a discharge hole 118 coincident with the passage 116 to allow coffee dispensed from the grinder mechanism 62 to flow into the channel chute 114 and into a container positioned below the discharge assembly 30. As shown in FIGS. 2 and 7, a deflector 120 is attached to the channel chute 114 to deflect ground coffee dispensed through the passage 116 downwardly into the channel chute 114. A pivoting cover 122 is attached to the channel chute proximate to the deflector 120. The pivoting cover 122 allows for some degree of movement to accommodate fluctuation in the flow through the discharge assembly 30.

The chaff retaining plate or chaff retainer 46 is positioned over the discharge hole 118 to provide a degree of back pressure on the flow of ground coffee through the passage in order to retain chaff in the ground coffee. The retention of chaff in the ground coffee is generally known by the use of a chaff retaining plate. The chaff retaining plate 46 retained on the upper portion of the channel chute 114 by a pivot pin 124. A torsion spring 126 is retained on the pivot pin 124 and biases the chaff retaining plate 46 over the discharge hole 118 against the dispensing flow of ground coffee through the passage 116. A lever arm 127 extends from the pivot pin 124 and abuts a side of the chaff retaining plate 46 facing the discharge hole 118.

In use, as whole bean coffee flows under the influence of gravity from the hopper 78 to the grinder mechanism 62, it is dispensed from the grinder mechanism 62 through the passage 116 and discharge hole 118. Ground coffee is initially deflected downwardly by the deflector 120 into and through the channel chute 114. During the grinding process, as ground coffee is dispensed through the discharge hole 118, the chaff retaining plate 46 acts against the flow of ground coffee to promote retention of the chaff within the ground coffee. The pivoting cover 122 freely pivots in response to fluctuations in the flow of ground coffee through the discharge assembly 30. At the end of the grinding cycle, the pivot pin 124 is manually rotated in order to release chaff which may have accumulated on the surface thereof. Rotation of the pivot pin upwardly (see arrow 129 in FIG. 8) engages the lever arm 127 against the plate 46 to overcome the biasing force of the spring 126 and move the plate 46 away from the hole 118.

Chaff may also accumulate on the inside surfaces of the deflector 120, the channel chute 114 and the pivoting cover 122. As such, it would be desirable to quickly and easily remove the accumulated chaff from these surfaces. The present invention includes the clean-out rod or member 48 which is operated to remove the chaff from these surfaces. The clean-out member 48 includes a protruding portion 128 which extends to engage an arm 130 of the pivot pin 124 to move or tap the chaff retaining plate 46 (see FIG. 8). The clean-out member 48 can be rotated upwardly so that the protruding portion 128 taps against a shoulder 132 of the pivoting cover 122. As such, the clean-out member 48 can be moved upwardly and downwardly to quickly and efficiently knock off the chaff from the chaff retaining plate 46 and the pivoting cover 122, respectively. Additionally, action of the pivoting cover 122 against the channel chute may vibrate chaff from the internal surfaces of the channel chute 114 as well as the deflector 120.

As briefly discussed hereinabove, the magnetic assembly 40 (as shown in FIG. 2) is positioned in the hopper 78 to prevent magnetic pieces, usually metallic pieces, from falling into the grinder mechanism 62. The magnetic assembly 40 is important to prevent magnetic pieces from entering the ground coffee and to prevent such pieces from becoming mixed in a beverage brewed therefrom. Additionally, it is important to keep magnetic pieces out of the grinder mechanism 62 to prevent damage to the grinding burrs. A top burr 134 is positioned over a bottom burr 136. The top and bottom burrs 134, 136 have faces with a plurality of grinding teeth or structures thereon. As at least one of the burrs is rotated, whole bean coffee is forced through the grinding burrs 134, 136 and dispensed through the passage 116.

The magnetic assembly 40 includes a support 138 and a magnetic body 140 attached thereto. The support 138 is designed to position the magnetic body 140 in a throat area 142 of the hopper 78 communicating with the grinder mechanism 62. The supports 138 and magnetic body 140 are sized and dimensioned to allow beans to flow from the hopper 78 through the throat 142 and into the grinder mechanism 62. Additionally, the supports 138 abut an internal surface of the hopper 78 and allow the magnetic assembly 40 to be fastened in place. This allows the magnetic assembly 40 may be periodically removed to clean magnetic pieces therefrom. As shown in FIG. 2, the hopper 78 is positioned above the grinder mechanism 62 in a gravity feed relationship such that upon activation of the grinder mechanism 62, beans will flow through the throat 142 for grinding. As the beans pass in close proximity or in contact with the magnetic body 140, any magnetic pieces which may have been accidentally introduced into the coffee supply will be captured for later removal. A generally small clearance is provided between the hopper and/or throat and the magnetic body in order to facilitate a thorough removal of any metallic particle from the bean as a result of close or intimate contact with the magnetic body 140.

A problem which commonly limits the grinding activity of prior art grinders is that operation of the grinder motor 60 and grinder mechanism 62 creates a considerable amount of waste heat. In prior art devices, the accumulation of heat, or more appropriately heated air, in the cabinet may produce a temporary or permanent failure of the grinder. In order to prevent accumulation of heated air, the present invention incorporates an active ventilation system 42. The active ventilation system 42 primarily include a thermostatic element or thermostat 144, a fan 146 and vents 148 formed in the cabinet 22. The active ventilation system 42 is operated when the thermostat 44 senses the temperature of the air within the cabinet 22 as being within a predetermined range. Air is moved through the cabinet by the fan 146 for removal therefrom.

As shown in the illustrated embodiment in FIG. 2, the vents 148 are positioned in the upper area 24 of the grinder 20. The fan 146 is positioned in the lower portion 26 of the grinder 20. Preferably, the thermostatic element 144 is positioned near the grinder mechanism 62 in order to accurately sense the temperature range of the grinder mechanism 62. Also shown in FIG. 2, the fan 146 is positioned to draw air into the cabinet 22 and force air upwardly through the vents 148. This configuration facilitates and exploits the natural convection phenomenon of heated air rising. Even before the fan 146 is activated, the position of the vents 148 in the upper portion 24 of the body 30 facilitate natural removal of heated air from the cabinet.

Figure 10:
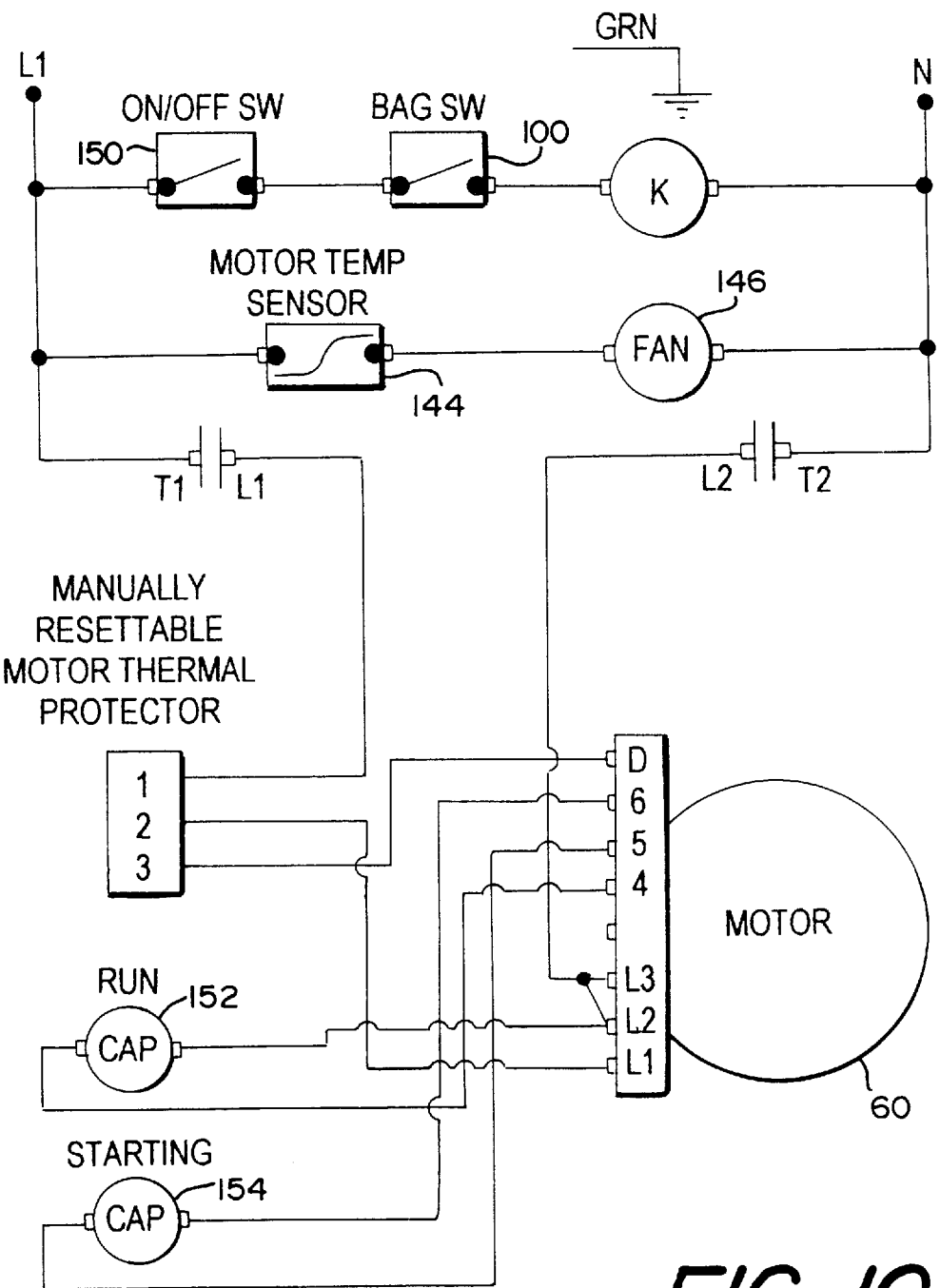
FIG. 10 is an electrical schematic of present invention.

Turning now to FIG. 10, a circuit diagram is provided. The electrical control of the present invention consists of a master on/off switch 150 which enables or disables power to the motor 60. When the master switch 150 is in the on position and the switch assembly 44 is activated by positioning the cam body 84 in the retaining position, the motor 60 will start. If the cam body 84 is in the release position, the switch 100 will be open and thus prevent operation of the motor 60. Once the motor is started and it has achieved a running condition, an electric start switch in the motor 60 will open thus removing a start capacitor 152 from the circuit. A run capacitor 154 will be maintained in the circuit even after the start capacitor 152 has been removed from the circuit. The thermostatic element or motor temperature sensor 144 and fan 146 are also included in the circuit to remove heated air from the cabinet when the thermostat 144 senses excessive heat.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. A grinder for grinding materials to produce a ground substance, said grinder comprising:

a cabinet, a grinder motor retained in said cabinet, a grinder mechanism coupled to said motor for grinding said material, and a hopper communicating with said grinder mechanism to deliver said material for grinding therein;

a discharge assembly positioned proximate to said grinder mechanism having a chute extending therefrom for discharging ground substance therethrough;

a container retaining assembly attached to said grinder for retaining a container in close proximity to said chute from which said ground material is dispensed from said grinder mechanism, said container retaining assembly including a cam body positioned between said grinder mechanism and said chute and pivotable away from and toward said chute between a releasing position and a retaining position, in said releasing position a container may be positioned between said chute and said cam body, in the retaining position, the cam body is pivoted towards said chute for retaining the container between said cam body and said chute;

an activation switch assembly attached to said grinder in close proximity to said container retainer and coupled to said grinder motor to selectively control said grinder wherein said grinder is activated when a container is placed and retained proximate to said grinder and said grinder motor is deactivated when said container retaining container proximate to said grinder;

a substance settling assembly attached to said grinder in proximity to said container retaining assembly for moving a container retained by container retaining assembly to setting said substance as it is dispensed from said grinder mechanism into said container, said substance settling assembly having a shaker plate attached to said grinder inside said cabinet and included an agitating device for acting on said shaker plate, said agitating device being positioned in said cabinet;

a chaff retaining plate pivotably positioned proximate to a grinder discharge passage for maintaining chaff in a ground substance; a clean-out member attached to said grinder and selectively engageable with said chaff retaining plate for pivoting said chaff retaining plate to allow chaff and ground substance to be exhausted from said grinder;

a magnetic collection device positioned in said hopper for capturing magnetic pieces to prevent such pieces from entering said grinder mechanism; and an active ventilation system providing passages in an upper portion of said cabinet and a fan in a lower portion of said cabinet for moving air through said through said cabinet and out through said passages for actively and controllably removing heat from said grinder.

2. A grinder as recited in claim 1, said substance settling assembly further comprising an arm extending from said grinder to a position spaced away from said grinder mechanism; and an agitating device coupled to said grinder and operatively coupled to said arm for moving said arm and a container retained by said container retaining assembly to settle ground substance dispensed into said container.

3. A grinder as recited in claim 2, said agitating device further comprising:

a cam carried on said grinder motor for acting on said arm to translate eccentric movement of said cam by said grinder motor to move said arm for inducing settling of ground substance dispensed into a container.

4. A grinder as recited in claim 3, said substance settling assembly further comprising:

a spring having a first end and a second end, said first end of said spring attached to said grinder and said second end of said spring attached to said settling arm, said spring facilitating movement of said arm relative to said grinder upon action of said agitating device on said arm.

5. A grinder as recited in claim 1, said container retaining assembly further comprising:

a cam body retained on said grinder selectively pivotable between a retaining position and a releasing position, said cam body abutting a portion of said grinder in a retaining position to retain a portion of a container between said cam body and said portion of said grinder, said cam body being pivotable away from said portion of said grinder to release a container therefrom.

6. A grinder as recited in claim 5, said container retaining assembly further comprising:

an activation switch coupled to said motor, said activation switch being selectively controllable upon movement of said cam body for activating and deactivating said motor in response to the position of said cam body, whereby said activation switch allows operation of said motor when said cam body is in a container retaining position and said activation switch assembly prevents operation of said motor when said cam body is in a releasing position.

7. A grinder as recited in claim 1, further comprising:

a hopper associated with said grinder for retaining a quantity of material in a gravity feed relationship with said grinder mechanism, a throat portion of said hopper in communication with said hopper and said grinder mechanism; and said magnetic device being positioned relative to said throat for capturing magnetic pieces to prevent said pieces from entering said grinder mechanism, said magnetic device being sized and dimensioned to facilitate movement of material around said magnetic device and into said throat of said hopper.

8. A grinder as recited in claim 1, said active ventilation system further comprising:

a thermostatic control coupled to said grinder;

a fan attached to said grinder and coupled to said thermostatic control, said fan being operated responsive to at least a range of predetermined temperatures sensed by said thermostatic control; and vents formed in said cabinet for passage of air from said cabinet therethrough;

whereby said fan is operated responsive to at least a range of temperatures sensed by said thermostatic control for moving air through said cabinet to cool said grinder, air moving through said vents in said cabinet under the influence of said fan.

9. A grinder as recited in claim 8, wherein said vents and said thermostatic control are positioned in an upper portion of said cabinet and said fan is positioned in a lower portion of said cabinet, said thermostatic control sensing the temperature in the upper portion of said cabinet, said fan operating in response to said thermostatic control to draw air into said cabinet and force said air upwardly through said cabinet and out through said vents in said upper portion of said cabinet.

10. A coffee settling assembly for use with a coffee grinder, said coffee grinder including a grinder mechanism and a discharge assembly coupled with said grinding mechanism for directing the discharging of a ground substance from said grinding mechanism, said coffee settling assembly comprising:

a shaker arm retained by the coffee grinder proximate to said discharge assembly, said shaker arm having a portion thereof spaced from the grinder abutting a container positioned proximate to the discharge assembly, which container is positioned for receiving ground coffee from the discharge assembly;

an agitating device positioned proximate to said discharge assembly for acting on said shaker arm for moving said shaker arm to facilitate settling of ground coffee dispensed into a container positioned against said shaker arm; and a container retaining assembly for retaining a mouth portion of a container proximate to the discharge assembly and abutting said shaker arm for translating movement of said shaker arm to move the container positioned proximate to and abutting said shaker arm.

11. A coffee settling assembly in claim 10, said agitating device further comprising:

a cam attached to the coffee grinder, said cam acting on said shaker arm for moving said shaker arm.

12. A coffee settling assembly as recited in claim 11, further comprising:

an actuator rod positioned between said cam and said arm for translating eccentric motion of said cam coupled to a drive shaft in the coffee grinder for reciprocally moving said shaker arm to facilitate settling of ground coffee dispensed into the container positioned thereagainst.

13. A coffee settling assembly as recited in claim 10, further comprising:

said arm extending from the grinder to a position below the discharge assembly; and the grinder further includes a grinder motor and a drive shaft attached thereto, the drive shaft being rotated by the grinder motor, said agitating device being coupled to the drive shaft for translating the motion of the grinder to move said shaker arm.

14. A coffee settling assembly as recited in claim 10, further comprising:

a spring having a first end attached to the grinder and a second end attached to said shaker arm, said shaker arm being coupled to the grinder by said spring, said spring facilitating movement of said shaker arm relative to the grinder.

15. A grinder for grinding a material to produce a ground substance including a grinder motor for driving a grinder mechanism, a discharge assembly is positioned proximate to said grinder mechanism and includes a chute extending therefrom for discharging ground substance therethrough, said grinder further including:

a container retaining assembly for retaining a container proximate to said discharge assembly to receive a ground substance therefrom, said container retaining assembly including a cam body positioned between said grinder and said chute and pivotable away from and toward said chute pivotable between a releasing position and a retaining position, in said releasing position a container may be positioned between said chute and said cam body, in the retaining position, the cam body is pivoted towards said chute for retaining the container between said cam body and said chute.

16. A grinder as recited in claim 15, further comprising:

an activation switch assembly attached to said grinder and coupled to said grinder motor, said activation switch assembly being operated by movement of said container retaining assembly to permit activation of said grinder motor when said cam body of said container retaining assembly is positioned in a retaining position and said activation switch assembly disabling said grinder motor when said cam body of said container retaining assembly is positioned in a releasing position.

17. A grinder as recited in claim 16, said activation switch assembly further comprising:

a cam pivoting member, said cam body being attached to said cam pivoting member, said cam pivoting member extending from said grinder to facilitate movement of said cam body by an operator of said grinder from a position displaced from said cam body, said cam pivoting member having a portion acting on said activation switch assembly for selectively engaging and operating said switch.

18. A grinder as recited in claim 17, said cam pivoting member further comprising:
   a flat area which allows said switch to move relative to said cam pivoting member; and
   a curved protruding portion which generally extends away from said flat area for operating said switch upon movement of said cam body.

19. A grinder as recited in claim 15, said cam body further comprising:
   means for gripping a container attached to said cam body, said gripping means gripping and engaging a surface of a container positioned relative to said discharge assembly for resisting removal of said container from said discharge assembly.

20. A coffee grinder having a motor, a grinding mechanism coupled to said motor and said motor and grinding mechanism being retained in a cabinet, said coffee grinder further comprising:
   an active ventilation system having a fan retained in a lower portion of said cabinet and vent passages in an upper portion of said cabinet, a thermostatic device retained relative to said grinder, said fan moving air through said cabinet in response to said thermostatic device for removing heated air from said cabinet through said vent passages to facilitate operation of said grinding motor and said grinding mechanism.

21. A coffee grinder as recited in claim 20, wherein said thermostatic device is positioned proximate to said grinder mechanism for sensing the temperature of said grinder mechanism.

22. A coffee grinder as recited in claim 21, wherein said vents are positioned above the thermostatic device for removing heated air from the cabinet.

23. A coffee grinder as recited in claim 22, wherein said fan is positioned in lower area of the cabinet, said fan forcing air upwardly through said cabinet and out through said vents to induce movement of heated air upwardly through said cabinet away from said motor and said grinding mechanism and out through said vents.

24. A coffee grinder having a grinder motor and a grinder mechanism coupled thereto, a discharge assembly is positioned proximate to said grinding mechanism for receiving and directing ground substance dispensed from said grinding mechanism away from said grinder, said grinding mechanism having a passage therein for moving ground substance from said grinding mechanism to said discharge assembly, a chaff retaining plate positioned over an end of said passage for retaining chaff in the ground coffee produced by the coffee grinder, a clean-out member attached to said discharge assembly for selectively engaging said chaff retaining plate to move said chaff retaining plate away from said passage in order to facilitate dispensing of chaff from said grinding mechanism and said passage; and
   a channel chute attached to said grinder, a pivot cover positioned over an open portion of said channel chute for directing ground coffee therethrough, said clean-out member moving said chaff retaining plate and rotating opposite relative to said chaff retaining plate for abutting and moving the pivot cover for removing chaff therefrom.

25. A coffee grinder as recited in claim 24, said discharge assembly comprising:
   a channel chute defining a channel therein attached to said grinder proximate to said passage, a deflector positioned relative to said channel chute and over an open end of said passage for deflecting ground coffee dispensed through said passage downwardly into said channel of said channel chute, and a pivoting cover attached to said discharge assembly proximate to both said deflector and said channel chute for preventing escape of ground coffee from said discharge assembly, said clean-out member being attached to said discharge assembly for selectively contacting said chaff retaining plate and said pivoting cover for removing chaff from both of said chaff retaining plate and said pivoting cover.

* * * * *

UNITED STATES PATENT AND TRADEMARK OFFICE
CERTIFICATE OF CORRECTION

PATENT NO. : 5,865,383
DATED : February 2, 1999
INVENTOR(S) : David F. Ford and Daniel R. Ephraim It is certified that error appears in the above-identified patent and that said Letters Patent is hereby corrected as shown below:

Column 10, Lines 14-15 "retaining container proximate to said grinder"

should be -- retaining assembly is not positioned to retain a container proximate to said grinder; --

Column 10, Line 19 "setting" should be -- settle --

Signed and Sealed this

Twenty-ninth Day of June, 1999

Attest:

Q. TODD DICKINSON

*Attesting Officer*     Acting Commissioner of Patents and Trademarks